Figures 1, 2:
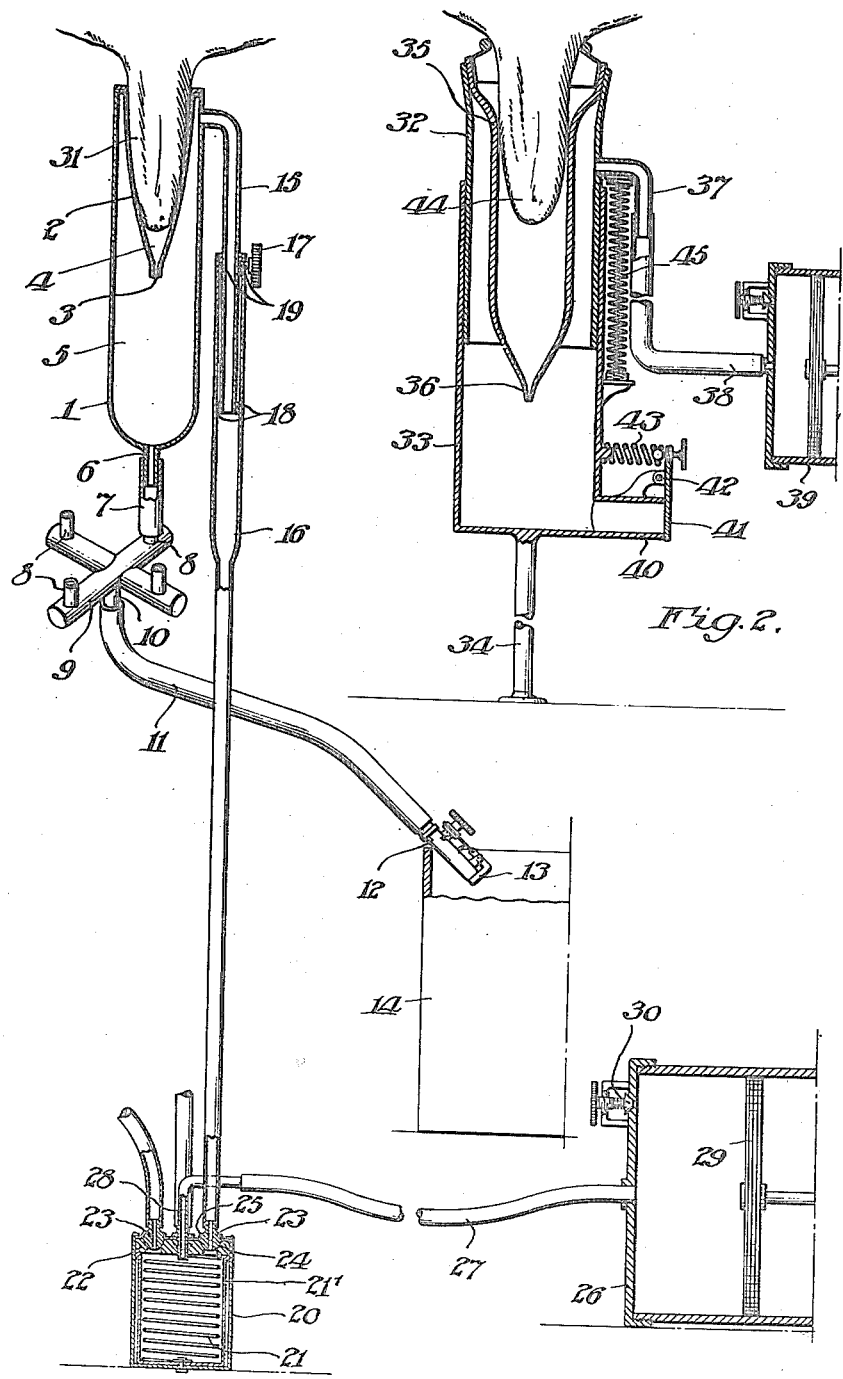

D. T. SHARPLES.
METHOD AND APPARATUS FOR MILKING.
APPLICATION FILED AUG. 9, 1916.

1,238,831.

Patented Sept. 4, 1917.

Inventor:
David Townsend Sharples,
By C. N. Butler
Attorney.

UNITED STATES PATENT OFFICE.

DAVID TOWNSEND SHARPLES, OF WEST CHESTER, PENNSYLVANIA.

METHOD AND APPARATUS FOR MILKING.

1,238,831. Specification of Letters Patent. Patented Sept. 4, 1917.

Application filed August 9, 1916. Serial No. 113,846.

*To all whom it may concern:*

Be it known that I, DAVID TOWNSEND SHARPLES, a citizen of the United States, residing at West Chester, in the county of Chester and State of Pennsylvania, have invented an Improved Method and Apparatus for Milking, of which the following is a specification.

My invention is an improved method and apparatus for extracting milk by sucking, pulling and pressing the teats of the animal, and its leading object is to effect clean and efficient milking, without injury or irritation, in a simple manner.

In the preferred practice of my invention, the teats of the animal are subjected to the action of a vacuum or partial vacuum and, simultaneously or in immediate sequence therewith, to a downward pull, followed by the application of pressure, continuously until the milk has been extracted. This operation is effected by a teat cup containing a perforated flexible member forming separated compartments having restricted communication, in combination with pneumatic means which partly exhausts one of the compartments, applies a partial vacuum to a teat in the other, and applies a weight to the teat, and alternately therewith applies pressure in the previously exhausted compartment, presses the flexible member against the teat and withdraws the weight applied thereto by the exhausting action.

The nature and characteristic features of my invention are fully disclosed in the following description and the accompanying drawings in illustration thereof.

In the drawings, Figure 1 is a diagrammatic sectional elevation of mechanism adapted for the practice of my invention; and Fig. 2 is a diagrammatic sectional elevation of a modified construction.

The mechanism illustrated in Fig. 1 of the drawings comprises a teat cup 1 containing the rubber tube or pocket 2 provided with the bottom slit or opening 3 and having its top fixed detachably in the top of the cup in any usual manner, the tube forming within the cup the compartments 4 and 5 adapted to communicate through the opening.

The bottom of the cup 1 is provided with a nipple 6 which is connected by a flexible tube 7 with a nipple 8 of a claw 9, and the claw is provided with a nipple 10 which is connected by a flexible tube 11 with a nozzle 12 provided with an adjustable check valve 13, the nozzle delivering to any suitable receptacle or conduit 14.

The teat cup 1 has connected therewith a tube 15 communicating with the compartment 5. A tube 16 has an end thereof telescoped on the free end of the tube 15 and is provided with a clamp 17, whereby the two tubes are adapted to be fixed together in the desired relation, close relationship being effected by the packing ring 18 fixed on the bottom of the tube 15 and the packing ring 19 fixed in the top of the tube 16.

A closed cylinder 20, containing the coiled spring 21 and the flexible bag or bellows 21′, is provided with the movable head or piston 22 which is connected with the lower end of the tube 16, the latter being provided with a ball 23 movable in a socket 24 of the head and held therein by the lip or flange 25 fixed to the head. A pump cylinder 26 is connected by a tube 27 with a nipple 28 fixed in the head 22, the cylinder containing a piston 29 coacting therewith to alternately exhaust and provide air under pressure in the cylinder 20 or the bellows 21′ thereof. A check valve 30 may be placed at any convenient place in the air line, as in the head of the cylinder 26, and is adjustable to regulate the pressure, which may be that of the atmosphere but preferably a superior pressure.

In operation, the chambered device 20 normally rests upon the ground or other support and the cut 1 is applied by loosening the clamp 11, adjusting the tube 15 in the tube 16 until the teat 31 has been properly entered in the compartment 4, and fastening the clamp so as to hold the adjustment. The rearward movement of the piston 29 in the cylinder 26 exhausts the air line comprising the parts 27, 28, 21′, 16, 15, 1, and 2, whereby the teat 31 is drawn into the compartment 4 so that the cup is pneumatically held to the udder. When the vacuum has increased sufficiently, so that the external pressure overcomes the resistance of the spring 21, the mechanism comprising the parts 20, 21′ and 22 is collapsed, the cylinder 20 rises from the ground, the weight of this mechanism and that previously supported thereby is applied to the teat, and the milk flows and collects in the outer compartment 5 and its connections 7, 9, and 11. In the reverse movement of the piston, as the vacuum decreases, the spring 21 expands, the cylinder 20 moves down to its support, the suction on the teat is relieved, the opening 3 in the teat pocket 2 closes as a check, and, as the pressure increases, the collected milk is forced out, against the action of the valve 13, into the receptacle 14, the teat pocket is pressed so as to squeeze the teat and the teat cup is pressed up against the udder of the cow, to prevent the pocket from being forced out or the teat from being forced out of the cup.

My invention may be embodied in different forms. As illustrated in Fig. 2, the teat cup comprises the shell section 32 and the telescoping shell section 33, provided with the supporting leg 34, in combination with the flexible tube or pocket 35 having its top engaged in the top of the section 32 and its bottom provided with the slot or opening 36.

The section 32 is provided with a tube or nipple 37 which is connected by the tube 38 with the pump 39. The section 33 is provided with the discharge orifice or spout 40 which is normally closed by a check valve 41 which rocks on the fulcrum 42 and is held closed normally by the adjustable spring 43. A coiled spring 45 is connected with the parts 32 and 33 so as to resist any tendency of the part 32 to move downward away from the teat in operation.

As in the previously described form of the invention, the teat 44 is placed in the pocket 35 and the section 32 is adjusted in the section 33 to obtain the desired relation of the cup to the udder, the telescoping parts being held in the desired relation in any suitable manner, as by friction. When the parts are properly adjusted, at the beginning of the operation, the teat cup is supported by the leg or strut 34 which rests or may rest on the floor and the teat is held in the pocket. In the exhausting action of the pump, the teat is subjected to a partial vacuum and is pulled by the weight of the teat cup, for the shell is collapsed as a result of the partial vacuum therein, the section 33 moving up on the section 32 so that the leg 34 is withdrawn from its support. The milk is thus caused to flow from the teat, and is held in the bottom of the shell 33. In the reverse action of the pump, the pocket 35 is collapsed, the opening 36 is closed, the section 33 moves down until the leg 34 rests upon its support, the pocket 35 is pressed against the teat, the section 32 is pressed up against the udder, the valve 41 is opened, and the milk is discharged through the orifice 40 to any suitable conduit or receptacle.

The simplicity of the constructions required for effecting efficiently the desired operation, which can be readily adjusted to the peculiarities of the animal, has the incidental advantages that the parts through which the milk flows are few, readily separated and readily cleaned, while adaptability for delivering milk to any ordinary receptacle adds a further obvious incidental advantage.

Having described my invention, I claim:

1. The method of milking which consists in applying a sucking or exhausting action and traction to the teat and alternately therewith compressing the same.

2. The method of milking which consists in compressing the teat and applying an upward thrust to the udder and alternately therewith applying a sucking or exhausting action and traction to said teat.

3. The mechanism for milking which comprises means for applying a sucking or exhausting action and compression alternately to the teat and means for intermittently applying traction thereto simultaneously with the suction.

4. The mechanism for milking which comprises means for applying compression to the teat and producing an upward thrust against the udder alternately with applying a sucking or exhausting action and traction to the teat.

5. The mechanism for milking which comprises a teat cup provided with a perforated flexible member forming communicating compartments therein, pneumatic means for providing alternating pressure and suction in said compartments, a conduit for discharging milk from said cup and a check valve for said conduit.

6. The mechanism for milking which comprises a teat cup, means for applying pressure and suction alternately thereto, and means whereby said suction applies weight to the cup.

7. The mechanism for milking which comprises a teat cup, a chambered device having relatively movable parts, normally supported independently of the animal, a duct connecting said teat cup and device, and means for alternately exhausting and applying pressure in said parts to effect the relative movement thereof.

8. The mechanism for milking which comprises a teat cup having communicating compartments, a pump, and a pneumatic line connecting said cup and pump, said line comprising a device having relatively movable parts collapsed by suction and expanded by pressure.

9. The mechanism for milking which comprises a teat cup, a milk conduit leading therefrom, and a pneumatic line connected therewith, said line having adjustable means for applying weight to said cup.

10. The mechanism for milking which comprises a teat cup, a milk conduit leading therefrom and a pneumatic line connected therewith, said line comprising a conduit manually adjustable in length and a device collapsible by suction, whereby weight is applied to said cup.

11. The mechanism for milking which comprises a teat cup, a milk conduit leading therefrom, a pump, and a pneumatic line connecting said pump with said cup, said line comprising a device adapted to be collapsed by suction and a conduit having telescoping sections for adjusting its length whereby said device is connected with said cup.

12. The mechanism for milking which comprises a teat cup provided with a perforated flexible member forming two compartments therein, one of said compartments adapted for receiving a teat, and a milk conduit and a pneumatic line connected with the other of said compartments, said milk conduit provided with a check valve and said pneumatic line comprising a collapsible device having relatively movable parts, a spring for normally separating said parts, and a conduit adjustable in length and flexibly connected with one of said parts.

In testimony whereof I have hereunto set my name this 5th day of Aug., 1916.

DAVID TOWNSEND SHARPLES.